US00RE47919E

(19) United States
(12) Reissued Patent
Vanderbent, Jr. et al.

(10) Patent Number: US RE47,919 E
(45) Date of Reissued Patent: Mar. 31, 2020

(54) SECURE CORNER ASSEMBLY FOR HIGH-STRENGTH WINDOWS

(71) Applicant: PGT Industries, Inc., North Venice, FL (US)

(72) Inventors: Kenneth John Vanderbent, Jr., Bradenton, FL (US); Samuel Ray Bryant, Englewood, FL (US); Arlin James Beechy, Sarasota, FL (US); Michael Dietmar Nau, North Port, FL (US)

(73) Assignee: PGT Industries, Inc., North Venice, FL (US)

(21) Appl. No.: 16/023,549

(22) Filed: Jun. 29, 2018

Related U.S. Patent Documents

Reissue of:
(64) Patent No.: 9,611,688
Issued: Apr. 4, 2017
Appl. No.: 15/046,229
Filed: Feb. 17, 2016

U.S. Applications:
(60) Provisional application No. 62/117,424, filed on Feb. 17, 2015.

(51) Int. Cl.

| | |
|---|---|
| ***E06B 3/96*** | (2006.01) |
| ***E06B 3/964*** | (2006.01) |
| ***E06B 3/98*** | (2006.01) |
| ***E06B 3/50*** | (2006.01) |
| ***E06B 3/968*** | (2006.01) |

(52) U.S. Cl.
CPC ..... *E06B 3/5063* (2013.01); *E06B 3/9641* (2013.01); *E06B 3/9648* (2013.01); *E06B 3/9688* (2013.01)

(58) Field of Classification Search
CPC .... E06B 2003/228; E06B 3/221; E06B 3/222; E06B 3/9641; E06B 3/5063; E06B 3/9688; E06B 3/9648
See application file for complete search history.

(56) References Cited

U.S. PATENT DOCUMENTS 1,479,799 A * 1/1924 Forsyth ..... E06B 3/5409 52/204.56
2,034,206 A * 3/1936 Rauchbaar ..... E06B 3/50 49/157

(Continued)

FOREIGN PATENT DOCUMENTS

DE 2300281 A1 * 7/1974 ..... E06B 3/9682
DE 9417867 U1 * 1/1995 ..... E05D 5/04
JP 2007277939 A * 10/2007

*Primary Examiner* — Sara S Clarke
(74) *Attorney, Agent, or Firm* — Taylor English Duma LLP

(57) ABSTRACT

Windows and secure corner assemblies are generally described. The windows may include a sash having stiles arranged on vertical sides thereof and rails arranged on horizontal sides thereof. Primary reinforcement members may be arranged within the stiles. Secure corner assemblies may be configured to be arranged within corners of the sash formed by intersections of the stiles and the rails. The secure corner assemblies may include at least one secondary reinforcement member arranged on an external surface of one of the rails, such as a top rail. A tilt mechanism may be configured to be coupled to a primary reinforcement member and the at least one secondary reinforcement member, thereby providing a continuous reinforcement connection around the window sash. Vinyl windows using corner assemblies according to some embodiments may have increased pressure ratings compared to vinyl windows that do not include such corner assemblies.

33 Claims, 4 Drawing Sheets

(56) References Cited

U.S. PATENT DOCUMENTS

| | | | | |
|---|---|---|---|---|
| 2,927,352 | A * | 3/1960 | Chenoweth | E06B 1/52 49/380 |
| 3,080,621 | A * | 3/1963 | Mendelsohn | E06B 3/5063 292/175 |
| 3,080,622 | A * | 3/1963 | Mendelsohn | E06B 3/2605 292/145 |
| 3,099,051 | A * | 7/1963 | Chenoweth | C07F 9/095 160/381 |
| 4,651,482 | A | 3/1987 | Borys | |
| 4,831,804 | A * | 5/1989 | Sayer | E06B 3/222 52/204.593 |
| 5,431,211 | A | 7/1995 | Guillemet | |
| 5,587,419 | A | 12/1996 | Lawson et al. | |
| 6,341,465 | B1 * | 1/2002 | Riegelman | E06B 3/9644 403/231 |
| 7,571,568 | B2 * | 8/2009 | Ito | E06B 3/5063 49/161 |
| 8,550,507 | B2 * | 10/2013 | Barton | E05D 15/582 292/194 |
| 2002/0023396 | A1 * | 2/2002 | Prevot | E05D 15/5205 52/204.5 |
| 2005/0115178 | A1 | 6/2005 | Schmidt | |
| 2005/0153122 | A1 | 7/2005 | Detterman | |
| 2005/0223661 | A1 | 10/2005 | Hetherington et al. | |
| 2007/0157521 | A1 * | 7/2007 | Ito | E06B 3/5063 49/185 |
| 2015/0040492 | A1 | 2/2015 | Rafter | |

* cited by examiner

SECURE CORNER ASSEMBLY FOR HIGH-STRENGTH WINDOWS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue application of U.S. Pat. No. 9,611,688, issued on Apr. 4, 2017, from U.S. patent application Ser. No. 15/046,229, filed on Feb. 17, 2016, which* claims the benefit of U.S. Provisional Application No. 62/117,424, entitled "Secure Corner Assembly for High-Strength Windows" and filed on Feb. 17, 2015, [the content] *each* of which is incorporated by reference in its entirety as if fully set forth herein.

BACKGROUND

Typically, windows for residential and smaller-scale commercial buildings incorporate a frame manufactured from a lightweight component such as aluminum. In some cases, to improve overall efficiency for windows, various plastics and vinyl materials have been used to manufacture the frame and sash components. However, there is typically a design sacrifice when using vinyl. For example, the overall strength rating of the window may be decreased as a result of using vinyl for the frame and sash components.

For particular markets, impact-rated windows may be required or desired for buildings. For example, in areas prone to hurricanes or tornadoes, windows having a high design pressure rating ("impact rating," "pressure rating," "design rating," or the like) (i.e., the amount of impact the window can absorb without breaking, typically measured in pounds per square foot) may be required by residential and commercial building codes. To achieve these requirements, while still providing an attractive and functional product, window manufacturers typically use aluminum as the framing/sash construction material because vinyl windows typically have reduced structural performance. For example, for similarly sized windows, an aluminum frame window may have a design pressure that exceeds 100 lbs/ft$^2$, while an unreinforced vinyl frame window may be limited to 50 lbs/ft$^2$. However, vinyl windows have improved performance characteristics in other areas such as energy efficiency, cost, and ease of installation.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a window may include at least one sash comprising two stiles arranged on opposing vertical sides of the sash and two rails arranged on opposing horizontal sides of the sash, in which four corners are formed by intersections of each of the two stiles with each of the two rails, two primary reinforcement members, each of the two primary reinforcement members being arranged within one of the two stiles, and a plurality of secure corner assemblies. Each of the plurality of secure corner assemblies may include at least one secondary reinforcement member coupled to one of the two rails, the at least one secondary reinforcement member being arranged along an external perimeter surface of the one of the two rails, and a tilt latch assembly being arranged within one of the four corners. The tilt latch assembly may include a vertical component coupled to one of the two primary reinforcement members, and a horizontal component coupled to the at least one secondary reinforcement member.

In an embodiment, a secure corner assembly for reinforcing a window may include at least one secondary reinforcement member coupled to a perimeter surface of a rail of the sash of the window and a tilt latch assembly configured to be arranged within a corner of the window. The tilt latch assembly may include a vertical component configured to be coupled to a primary reinforcement member arranged within a stile of the sash, and a horizontal component configured to be coupled to the at least one secondary reinforcement member.

In an embodiment, a method of manufacturing a window may include providing at least one sash comprising two stiles arranged on opposing vertical sides of the sash and two rails arranged on opposing horizontal sides of the sash, in which four corners are formed by intersections of each of the two stiles with each of the two rails, arranging each of two primary reinforcement members within one of the two stiles, and providing a plurality of secure corner assemblies. The secure corner assemblies may include at least one secondary reinforcement member coupled to one of the two rails, the at least one secondary reinforcement member being arranged along an external perimeter surface of the one of the two rails, and a tilt latch assembly being arranged within one of the four corners. The tilt latch assembly may include a vertical component coupled to one of the two primary reinforcement members, and a horizontal component coupled to the at least one secondary reinforcement member.

DETAILED DESCRIPTION

The following terms shall have, for the purposes of this application, the respective meanings set forth below.

A "window" refers to an opening in a building such as a defined opening in a door or wall. A window typically includes various components such as, for example, a frame, glass, a head, a jamb, a sash, stiles, rails, and a sill.

A "window frame" refers to the combination of the head, jambs and sill that form a precise opening for a window. The "head" refers to the main horizontal component at the top of the frame, the "jambs" refer to the main vertical components of the frame, and the "sill" refers to the main horizontal component at the bottom of the frame. The window frame also forms the opening into which the window sash fits.

A "window sash" refers to an assembly of stiles and rails positioned such that they form an inner frame within the external window frame positioned to hold the glass within the window frame. In general, a window sash includes two stiles arranged on opposing vertical sides (i.e., left and right sides) of the sash and two rails arranged on opposing horizontal sides (i.e., top and bottom sides) of the sash.

The disclosed technology generally relates to an improved window having various improved features and components which enable a window, such as a vinyl window, to have improved design pressure ratings while providing high energy and cost efficiency characteristics.

Vinyl is an optimal material for manufacturing frame and sash components for a window due to the potential energy savings and generally lower cost when compared to other materials, such as aluminum. However, conventional manufacturing techniques typically result in vinyl windows that have lower design pressure characteristics when compared to windows formed from higher-strength materials, including aluminum. Accordingly, conventional vinyl windows generally have structural restrictions and limited installation options in markets where windows with high impact ratings are required. The described technology provides a corner component or key that integrates structural window components (e.g., tilt latch, pivot bar, roller housing) and includes aluminum structural reinforcements configured to provide additional impact strength in a window, such as a vinyl window. Thus, a secure connection attaches to an aluminum reinforcement inside the window sash and integrates with one or more mechanisms for connecting the sash to the window frame.

Figure 1A:
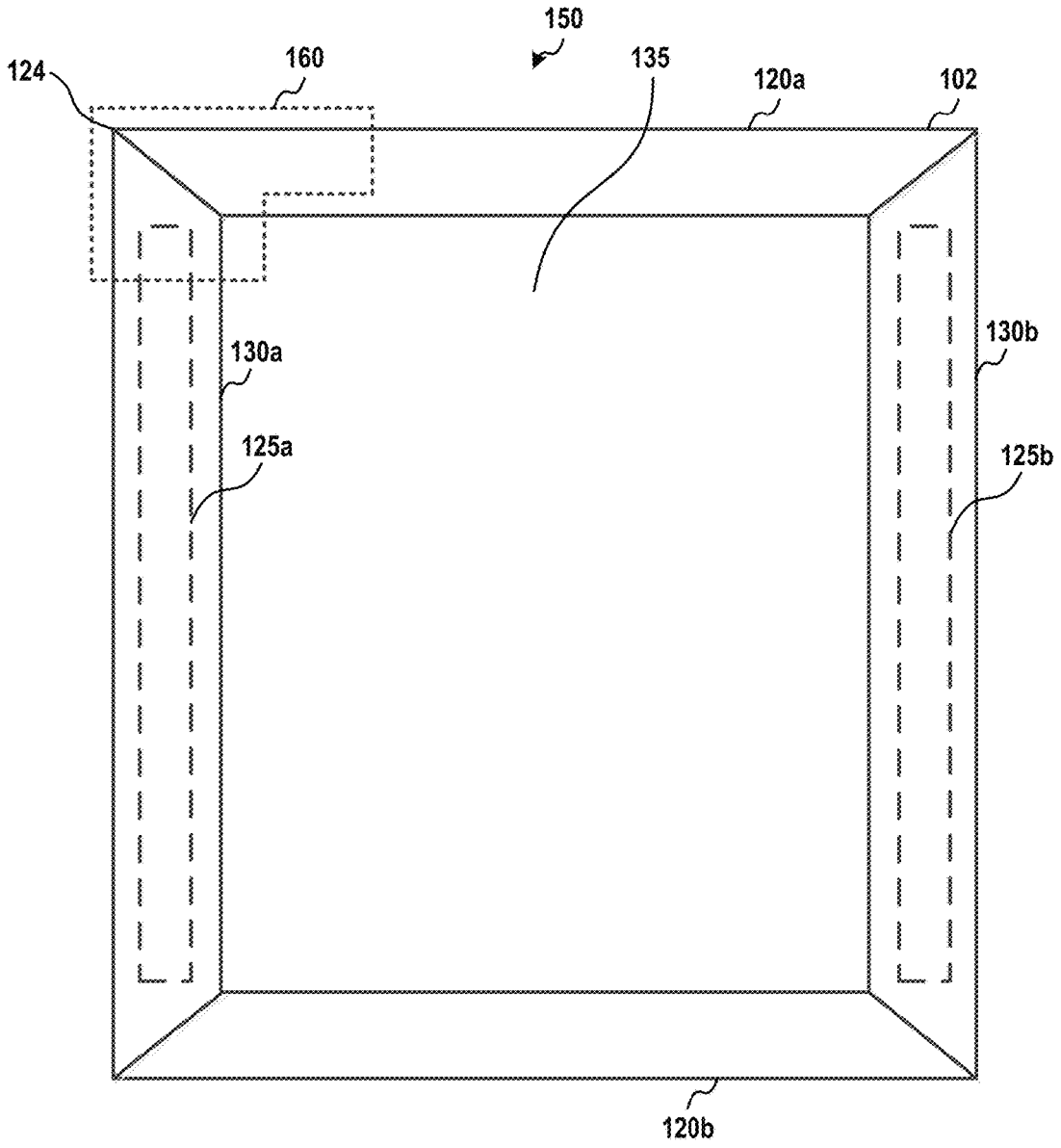
FIG. 1A depicts an illustrative window according to some embodiments.

FIG. 1A depicts an illustrative window according to some embodiments. As shown in FIG. 1A, a window 150 may include a sash 102 formed from two rails 120a, 120b arranged on opposing horizontal sides of the sash. The sash 102 may also include stiles 130a, 130b arranged on opposing vertical sides of the sash. The rails 120a, 120b intersect with the stiles 130a, 130b to form a generally square or rectangular shaped sash 102. A corner 124 is formed where each rail 120a, 120b intersects a stile 130a, 130b (although multiple corners are depicted in FIG. 1A, only one is labeled to simplify the figure). A pane of glass 135 may be supported by the sash 102. At least one primary reinforcement member 125a, 125b may be arranged within a stile 130a, 130b. In some embodiments, the at least one primary reinforcement member 125a, 125b may be arranged within a rail 120a, 120b. In an embodiment in which a primary reinforcement member 125a, 125b is arranged within a stile 130a, 130b, there may be no primary reinforcement member arranged within a rail 120a, 120b. In an embodiment in which a primary reinforcement member 125a, 125b is arranged within a rail 120a, 120b, there may be no primary reinforcement member arranged within a stile 130a, 130b.

In some embodiments, the rails 120a, 120b and the stiles 130a, 130b may be formed from a polymer material, such as vinyl, nylon, rubber, and/or a combination thereof. In some embodiments, the primary reinforcement members 125a, 125b may be formed from a metal material, such as aluminum. In some embodiments, a window 150 may include a plurality of sashes 102. For example, a "double-hung" window may include two sashes 102.

Figure 1B:
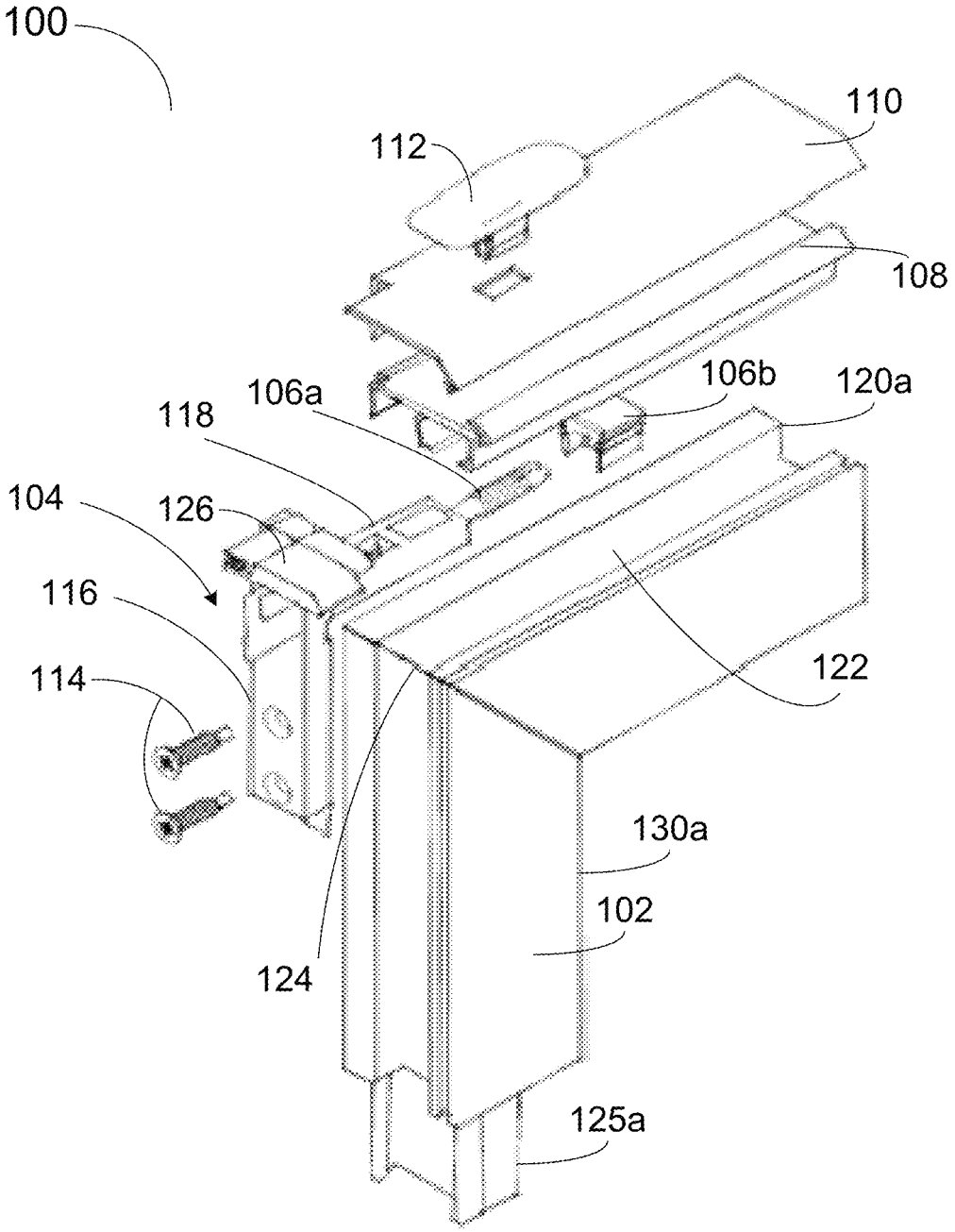
FIG. 1B depicts an exploded view of a secure corner assembly according to some embodiments.

FIG. 1B depicts an exploded view of a secure corner assembly 100 arranged at the corner 124 within area 160 of FIG. 1A. The secure corner assembly 100 may be configured to, among other things, securely fasten to a window sash 102 such that the impact rating of an associated window 150 may be improved over conventional windows, including conventional vinyl windows.

As shown in FIG. 1B, the secure corner assembly 100 may include a tilt latch assembly 104 configured, for example, to fit within a slot in a window frame. The tilt latch assembly 104 may include a latch 126 configured to facilitate movement of the window sash 102 and glass (i.e., vertical movement of the sash within the window frame), thereby providing for operation of the window. Although a tilt latch assembly 104 with a tilt latch mechanism 126 is used to describe certain embodiments herein, embodiments are not so limited. For example, a tilt latch assembly 104 without a tilt latch mechanism or tilt latch functionality is contemplated according to some embodiments herein.

The tilt latch assembly 104 may include a vertical component 116 and a horizontal component 118. In some embodiments, the vertical component 116 and the horizontal component 118 may be a single continuous piece. In some embodiments, the vertical component 116 and the horizontal component 118 may be separate pieces coupled together, for example using a fastener, clip, flange, a combination thereof, and/or the like. The vertical component 116 may be coupled to a stile 130a, 130b using, for example, fasteners 114. However, this is provided by way of example only and other similar fasteners may be used. Additionally, other components such as plug 112 may be incorporated into the secure corner assembly design. For example, as shown in FIG. 1, the plug 112 may cover an access or removal point in the cap 110 that may be used to remove the cap to access the tilt latch assembly 104 or the reinforcement member 108. In some embodiments, the vertical component 116 may also be coupled to a primary reinforcement member 125a within the stile 130a, 130b.

In some embodiments, the horizontal component 118 may be coupled to the secondary reinforcement member 108, for example, using fasteners, clips, flanges, and/or combinations thereof, and/or the like. The tilt latch assembly 104 may include a resilient member 106a, such as a spring (e.g., "spring mechanism"), and a tensioning mechanism 106b that are positioned and configured to provide a tensioned attachment option to one or more additional components of the secure corner assembly 100. For example, a secondary reinforcement member 108 may include a slot or other similar receptacle defined thereon into which the spring mechanism 106a and the tensioning mechanism 106b may be positioned, thereby providing a tensioned joint between the tilt latch assembly 104 and the secondary reinforcement member 108 while still being removable for repair or replacement after the window is manufactured and/or installed. In some embodiments, the secondary reinforcement member 108 may be arranged on an external surface 122 (a "perimeter surface" or "perimeter channel") of a rail 120a, 120b. In some embodiments, the perimeter surface 122 may be formed as a channel within the rail 120a, 120b. In some embodiments, the secondary reinforcement member 108 may extend substantially along a length of a rail 120a, 120b, for example, from a first tilt latch assembly 104 located on a first side of sash 102 to a second tilt latch assembly located on a second side of the sash.

In some embodiments, the secondary reinforcement member 108 may be arranged within a rail 120a, 120b. In some embodiments, the secondary reinforcement member 108 may be arranged at least partially within a rail 120a, 120b. In some embodiments, a secondary reinforcement member 108 may be arranged on one of the rails 120a, 120b. In some embodiments, a secondary reinforcement member 108 may be arranged on both of the rails 120a, 120b. In some embodiments, a primary reinforcement member 125a, 125b may be arranged within one or more of the rails 120a, 120b and a secondary reinforcement member 108 may be arranged on a perimeter surface of the stiles 130a, 130b. In some embodiments, a primary reinforcement member 125a, 125b may be arranged within one or more of the stiles 130a, 130b and a secondary reinforcement member 108 may be arranged on one or more of the rails 120a, 120b.

A cap 110 may be removably attached to the secondary reinforcement member 108, thereby concealing the secondary reinforcement member from view after construction and/or installation of the window. Thus, the secondary reinforcement member 108 may be made from a different material than that of the exterior and visible components of the window such as the sash 102 and the cap 110. For example, the sash 102 and the cap 110 may be constructed from a polymer material such as vinyl, and the reinforcement member 108 may be constructed from aluminum. Similarly, the tilt latch assembly 104 may be constructed from a variety of materials. For example, the tilt latch assembly 104 may include an injection molded nylon polymer, vinyl, metal, aluminum, and/or a zinc material (e.g., a zinc die cast material).

It should be noted that the design and construction of the secure corner assembly 100 as shown in FIG. 1B is provided by way of example only. Additional designs and components may be utilized based upon the operational and structural requirements of the window being designed and/or manufactured. For example, FIG. 2 illustrates several alternative designs for the secure corner assembly.

Figure 2:
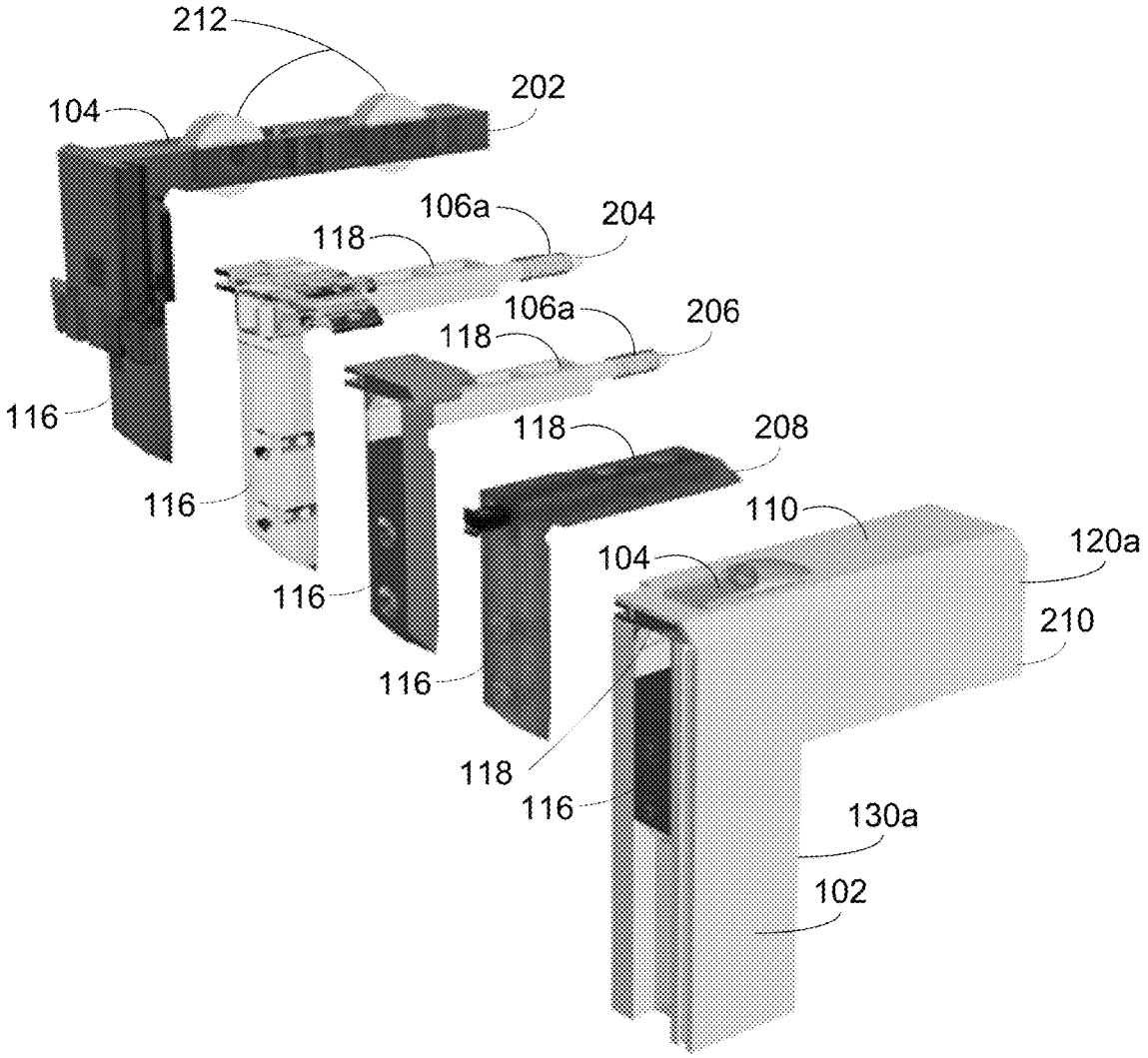
FIG. 2 depicts illustrative secure corner assemblies according to some embodiments.

As shown in FIG. 2, a secure corner assembly 202 may be designed such that a set of horizontal rollers 212 are included, thereby providing for the window sash and glass assembly to slide horizontally within the window frame. Additionally, a secure corner assembly 204 may be designed to accommodate a double hung window. Alternatively, a secure corner assembly 206 may be configured for a single hung window. Another secure corner assembly 208 may include a pivot point for pivotally opening and closing the window.

As shown in FIG. 2, sash assembly 210 includes a complete secure corner assembly (such as secure corner assembly 100 as shown in FIG. 1 and described above) together with a window sash 102. As described herein, the sash assembly 210 may be manufactured primarily out of vinyl, thereby realizing the thermal and energy efficiencies associated with vinyl. However, by also incorporating the secure corner assembly as disclosed herein, the sash assembly 210 may have an increased impact rating compared to a sash assembly that does not include a sash assembly configured according to some embodiments. For instance, a vinyl window incorporating a sash assembly 210 may have an impact rating substantially similar to those of sashes made from a metal, such as aluminum.

It should be noted that the alternative designs as shown in FIG. 2 are provided by way of example only, and are not intended to limit the secure corner assembly as described herein to any particular embodiment.

Figure 3A:
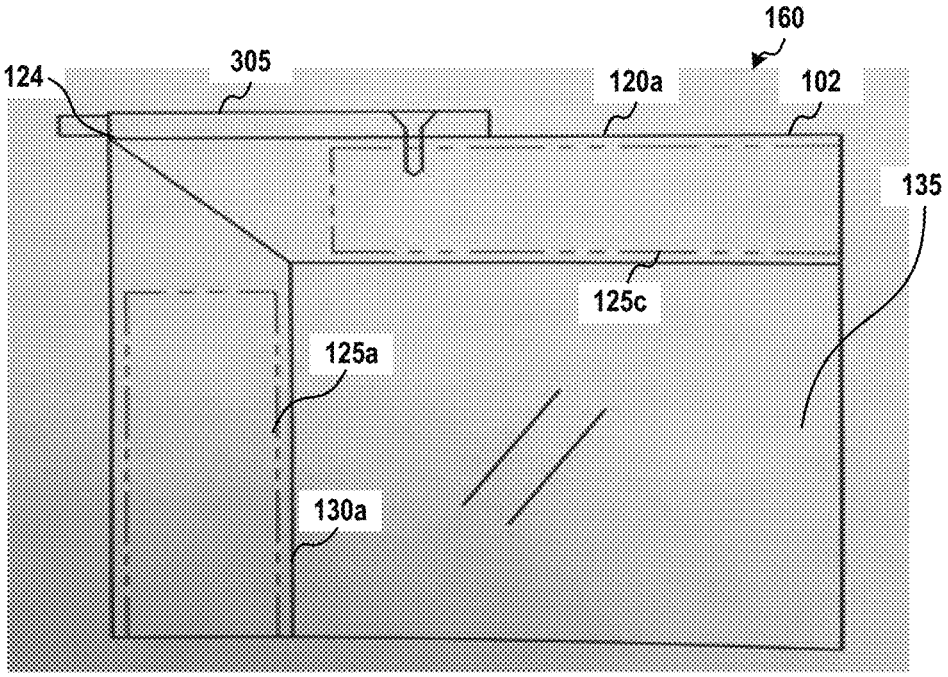
FIG. 3A (Prior Art)
FIG. 3A depicts an illustrative prior art vinyl window.

FIG. 3A depicts an illustrative prior art vinyl window. As shown in FIG. 3A, primary reinforcement members 125a, 125c are arranged within a stile 130a and a rail 120a of the window 160. Due to manufacturing limitations, the primary reinforcement members 125a, 125c do not extend into the corner 124. In addition, conventional tilt latch assemblies 305 only connect with the rail 125c, particularly the top rail. Accordingly, the corner 124 is not reinforced and is a weak point of the window, reducing the overall impact rating. Under typical impact/cycle loads, the sash corner 124 can crack and cause product failure. An alternative design to existing corner construction can include adding a corner brace or gusset to transfer load from the sash components (not shown). However, in such a design, stress from the impact/cycle loads is then transferred to the tilt latch mechanism, which is not designed to withstand such loads. This may lead to a failure or other structural limitation of the tilt latch mechanism and/or the entire window.

Figure 3B:
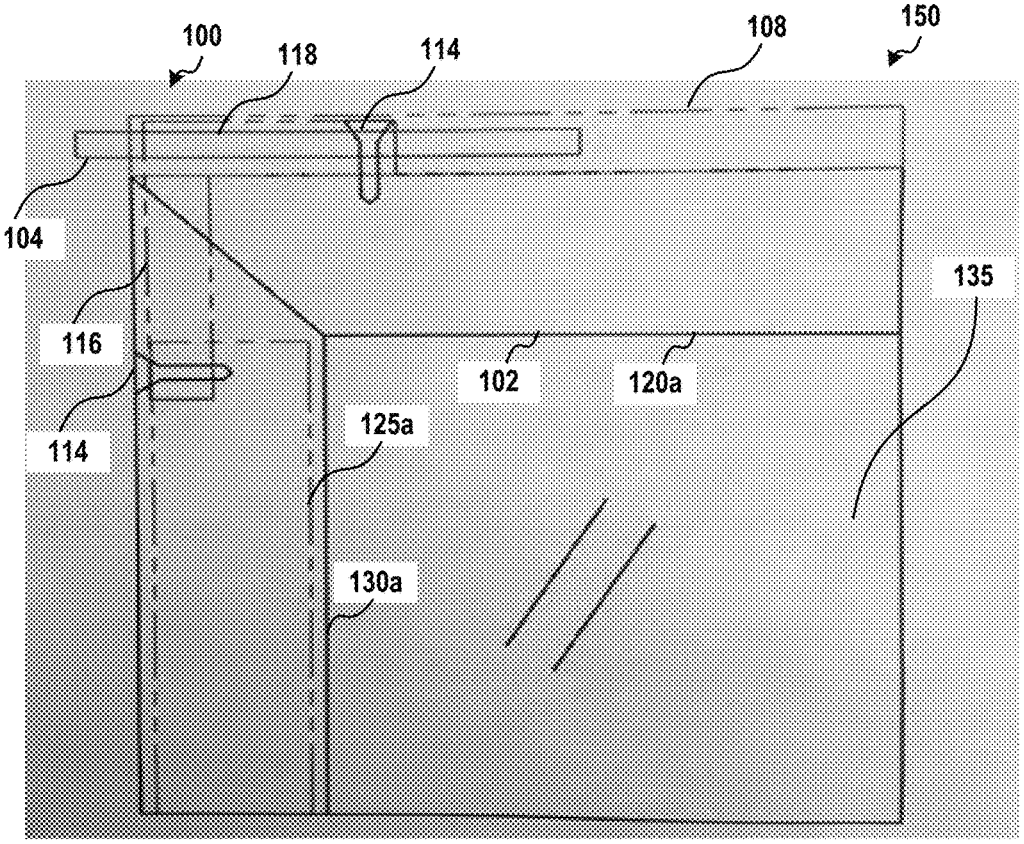
FIG. 3B depicts an illustrative vinyl window according to some embodiments.

FIG. 3B depicts an illustrative vinyl window according to some embodiments. As shown in FIG. 3B, a secure corner assembly 100 according to some embodiments may include a latch tilt assembly 104 that may be coupled to both a primary reinforcement member 125a and a secondary reinforcement member 108. Accordingly, a secure corner assembly 100 according to some embodiments (a secure corner "key") may be integral to the latch tilt assembly 104, which may transfer, distribute, or otherwise reduce the impact and/or load cycle force on the corner 124, thereby enabling the sash 102 to achieve higher design pressure ratings than windows that do not use a corner assembly configured according to some embodiments.

In some embodiments, a vinyl window configured according to some embodiments may have a design pressure of about 65 lbs/ft$^2$ to about 110 lbs/ft$^2$. In some embodiments, a vinyl window configured according to some embodiments may have a design pressure greater than 80 lbs/ft$^2$, greater than 100 lbs/ft$^2$, greater than 125 lbs/ft$^2$, greater than 150 lbs/ft$^2$, and ranges and values between any two of these values (including endpoints).

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A window, comprising:

at least one sash comprising two stiles arranged on opposing vertical sides of the sash and two rails arranged on opposing horizontal sides of the sash, wherein four corners are formed by intersections of each of the two stiles with each of the two rails;

two primary reinforcement members, each of the two primary reinforcement members being arranged within one of the two stiles; and a plurality of secure corner assemblies comprising:

at least one secondary reinforcement member coupled to one of the two rails, the at least one secondary reinforcement member being arranged along an external perimeter surface of the one of the two rails, and a tilt latch assembly being arranged within one of the four corners, the tilt latch assembly comprising a vertical component coupled to one of the two primary reinforcement members, and a horizontal component coupled to the at least one secondary reinforcement member.

2. The window of claim 1, wherein the two stiles and the two rails are formed from vinyl.

3. The window of claim 1, wherein each of the two primary reinforcement members is formed from aluminum.

4. The window of claim 1, wherein the at least one secondary reinforcement member is formed from aluminum.

5. The window of claim 1, wherein the tilt latch assembly is formed from at least one of a nylon polymer material and a zinc material.

6. The window of claim 1, further comprising a cap configured to enclose the at least one secondary reinforcement member.

7. The window of claim 1, further comprising:

a resilient member arranged on the vertical component; and a tensioning mechanism configured to provide a tensioned joint between the tilt latch assembly and the at least one secondary reinforcement member.

8. The window of claim 1, wherein the two stiles and the two rails are formed from vinyl, and the window has a pressure rating of greater than 80 lbs/ft$^2$.

9. A secure corner assembly for reinforcing a window, the secure corner assembly comprising:

at least one secondary reinforcement member coupled to a perimeter surface of a rail of the sash of the window, and a tilt latch assembly configured to be arranged within a corner of the window, the tilt latch assembly comprising:

a vertical component configured to be coupled to a primary reinforcement member arranged within a stile of the sash, and a horizontal component configured to be coupled to the at least one secondary reinforcement member.

10. The secure corner assembly of claim 9, wherein the at least one secondary reinforcement member is formed from aluminum.

11. The secure corner assembly of claim 9, wherein the tilt latch assembly is formed from at least one of a nylon polymer material and a zinc material.

12. The secure corner assembly of claim 9, further comprising a cap configured to enclose the at least one secondary reinforcement member.

13. The secure corner assembly of claim 9, further comprising:

a resilient member arranged on the vertical component; and a tensioning mechanism configured to provide a tensioned joint between the tilt latch assembly and the at least one secondary reinforcement member.

14. A method of manufacturing a window, the method comprising:

providing at least one sash comprising two stiles arranged on opposing vertical sides of the sash and two rails arranged on opposing horizontal sides of the sash, wherein four corners are formed by intersections of each of the two stiles with each of the two rails;

arranging each of two primary reinforcement members within one of the two stiles; and providing a plurality of secure corner assemblies comprising:

at least one secondary reinforcement member coupled to one of the two rails, the at least one secondary reinforcement member being arranged along an external perimeter surface of the one of the two rails, and a tilt latch assembly being arranged within one of the four corners, the tilt latch assembly comprising a vertical component coupled to one of the two primary reinforcement members, and a horizontal component coupled to the at least one secondary reinforcement member.

15. The method of claim 14, wherein the two stiles and the two rails are formed from vinyl.

16. The method of claim 14, wherein each of the two primary reinforcement members is formed from aluminum.

17. The method of claim 14, wherein the at least one secondary reinforcement member is formed from aluminum.

18. The method of claim 14, wherein the tilt latch assembly is formed from at least one of a nylon polymer material and a zinc material.

19. The method of claim 14, further comprising providing a cap configured to enclose the at least one secondary reinforcement member.

20. The method of claim 14, further comprising:

forming a resilient member arranged on the vertical component; and providing a tensioning mechanism configured to provide a tensioned joint with the resilient member between the tilt latch assembly and the at least one secondary reinforcement member.

*21. A window comprising:*

*a sash comprising two stiles arranged on opposing vertical sides of the sash and two rails arranged on opposing horizontal sides of the sash, wherein four corners are formed by intersections of each of the two stiles with each of the two rails;*

*a primary reinforcement member arranged within one of the two stiles; and*

*a secondary reinforcement member coupled to one of the two rails, the secondary reinforcement member coupled to the primary reinforcement member at a first corner of the four corners; and*

*wherein the secondary reinforcement member is arranged along an external perimeter surface of the one of the two rails.*

*22. The window of claim 21, wherein:*

*the primary reinforcement member is a first primary reinforcement member;*

*the window further comprises a second primary reinforcement member arranged within a second of the two stiles; and*

*the secondary reinforcement member is coupled to the second primary reinforcement member at a second corner of the four corners.*

*23. The window of claim 21, further comprising a tilt latch assembly arranged within the one of the four corners, the tilt latch assembly coupling the primary reinforcement member to the secondary reinforcement member.*

*24. The window of claim 23, wherein the tilt latch assembly comprises:*

*a vertical component coupled to the primary reinforcement member; and*

*a horizontal component coupled to the secondary reinforcement member.*

*25. The window of claim 21, wherein the two stiles and the two rails are formed from vinyl.*

*26. The window of claim 25, wherein the window has a pressure rating of greater than 80 lbs/ft$^2$.*

*27. The window of claim 21, wherein the primary reinforcement member and the secondary reinforcement member are formed from aluminum.*

*28. The window of claim 21, wherein the secondary reinforcement member extends substantially along a length of the one of the two rails, and wherein the primary reinforcement member extends substantially along a length of the one of the two stiles.*

*29. The window of claim 21, wherein the primary reinforcement member extends in a vertical direction, and wherein the secondary reinforcement member extends in a horizontal direction.*

*30. A window comprising:*

*a sash comprising two stiles arranged on opposing vertical sides of the sash and two rails arranged on opposing horizontal sides of the sash, wherein four corners are formed by intersections of each of the two stiles with each of the two rails;*

*a primary reinforcement member arranged within one of the two stiles;*

*a tilt latch assembly arranged within one of the four corners, the tilt latch assembly coupled to the primary reinforcement member; and*

*a secondary reinforcement member coupled to one of the two rails and arranged along an external perimeter surface of the one of the two rails.*

*31. The window of claim 30, wherein the two stiles and the two rails are formed from vinyl and wherein the primary reinforcement member is formed from aluminum.*

*32. The window of claim 30, wherein the tilt latch assembly comprises a vertical component coupled to the primary reinforcement member.*

*33. The window of claim 30, wherein the primary reinforcement member extends in a vertical direction.*

* * * * *